United States Patent
Liao et al.

(10) Patent No.: US 11,347,140 B2
(45) Date of Patent: May 31, 2022

(54) ILLUMINATION SYSTEM AND PROJECTION DEVICE

(71) Applicant: Coretronic Corporation, Hsin-Chu (TW)

(72) Inventors: Chien-Chung Liao, Hsin-Chu (TW); Hung-Wei Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/209,088

(22) Filed: Mar. 22, 2021

(65) Prior Publication Data
US 2021/0356852 A1    Nov. 18, 2021

(30) Foreign Application Priority Data

May 13, 2020   (CN) .......................... 202020784469.X

(51) Int. Cl.
*G03B 21/20*   (2006.01)

(52) U.S. Cl.
CPC ....... *G03B 21/208* (2013.01); *G03B 21/2013* (2013.01)

(58) Field of Classification Search
CPC ........................... G03B 21/208; G03B 21/2013
USPC ............................................................ 353/94
See application file for complete search history.

(56) References Cited

U.S. PATENT DOCUMENTS

| | | | |
|---|---|---|---|
| 11,112,684 B2 | 9/2021 | Liu et al. | |
| 11,163,227 B2 | 11/2021 | Lin et al. | |
| 11,199,765 B2 | 12/2021 | Pan et al. | |
| 2014/0232992 A1* | 8/2014 | Egawa | G03B 21/208 353/30 |
| 2021/0294200 A1 | 9/2021 | Pan | |
| 2021/0356852 A1 | 11/2021 | Liao et al. | |

FOREIGN PATENT DOCUMENTS

| | | | | |
|---|---|---|---|---|
| CN | 105116675 A | * | 12/2015 | ........... G02B 26/008 |
| CN | 102385232 | | 11/2016 | |
| CN | 208172483 | | 11/2018 | |
| CN | 210142255 | | 3/2020 | |
| JP | 2019061083 A | * | 4/2019 | |
| WO | WO-2018173200 A1 | * | 9/2018 | ......... G03B 21/2013 |

OTHER PUBLICATIONS

"Office Action of U.S. Appl. No. 17/211,747", dated Jan. 20, 2022, pp. 1-17.

* cited by examiner

*Primary Examiner* — Jerry L Brooks
(74) *Attorney, Agent, or Firm* — JCIPRNET

(57) ABSTRACT

An illumination system and a projection device are provided. The illumination system includes a first light source, a second light source, and a diffusion element. The first light source is configured to emit a first beam, and the second light source is configured to emit a second beam. The first beam and the second beam have different colors. The diffusion element is disposed on transmission paths of the first beam and the second beam, and has a first diffusion region and a second diffusion region with different diffusion degrees. The first beam and the second beam pass through the diffusion element once, respectively, wherein the first beam passes through the first diffusion region, and the second beam passes through the second diffusion region. The illumination system and the projection device invention may effectively resolve a speckle issue of the beams.

18 Claims, 4 Drawing Sheets

ILLUMINATION SYSTEM AND PROJECTION DEVICE

CROSS-REFERENCE TO RELATED APPLICATION

This application claims the priority benefit of China patent application serial no. 202020784469.X, filed on May 13, 2020. The entirety of the above-mentioned patent application is hereby incorporated by reference herein and made a part of this specification.

BACKGROUND OF THE INVENTION

Field of the Invention

The invention relates to an optical system and an optical device, and in particular, to an illumination system and a projection device.

Description of Related Art

With the development of optical technologies, solid-state lighting technologies, including applying light sources of a light-emitting diode (LED) and/or a laser diode (LD), have been increasingly applied to a projector. In comparison with the LED, the LD may provide a beam with higher intensity as the light source of the projector. Therefore, a pure color light source required by the projector and generated by exciting phosphor through a laser light source has been gradually developed. In addition, a laser projection device may not only use the laser light source to excite the phosphor to emit light but also directly use laser as an illumination source of the projector, and the laser projection device has the advantage of adjusting the number of light sources in response to brightness requirements, so as to meet the requirements of the projector for different brightness.

In general, the LD light source may easily encounter a speckle issue in imaging, which may result in a decrease in optical imaging quality. In order to resolve the laser speckle issue, a common way is to place a diffusion element at a location where optical paths are concentrated. However, if a diffusion degree (haze) of the diffusion element is increased for enhancing the diffusing effect, the optical coupling efficiency may be reduced.

The information disclosed in the "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be solved by one or more embodiments of the invention were acknowledged by people of ordinary skill in the pertinent art.

SUMMARY OF THE INVENTION

The invention provides an illumination system and a projection device, which can effectively resolve a speckle issue of an excitation beam and have better optical efficiency.

Other objectives and advantages of the invention can be further understood from the technical features disclosed by the invention.

In order to achieve one or a part or all of the foregoing objectives or other objectives, an embodiment of the invention provides an illumination system, including a first light source, a second light source, and a diffusion element. The first light source is configured to emit a first beam, and the second light source is configured to emit a second beam. The first beam and the second beam have different colors. The diffusion element is disposed on transmission paths of the first beam and the second beam and includes a first diffusion region and a second diffusion region with different diffusion degrees. The first beam and the second beam pass through the diffusion element once, respectively, wherein the first beam passes through the first diffusion region, and the second beam passes through the second diffusion region.

In order to achieve one or a part or all of the foregoing objectives or other objectives, an embodiment of the invention provides an illumination system, including a first light source, a second light source, a first diffusion element, and a second diffusion element. The first light source is configured to emit a first beam, and the second light source is configured to emit a second beam. The first beam and the second beam have different colors, respectively. The first diffusion element is disposed on a transmission path of the first beam. The second diffusion element is disposed on a transmission path of the second beam and on the transmission path of the first beam from the first diffusion element, and the first beam and the second beam pass through different positions on the second diffusion element, respectively.

In order to achieve one or a part or all of the foregoing objectives or other objectives, an embodiment of the invention provides a projection device including the foregoing illumination system, at least one light valve, and a projection lens. The illumination system is configured to provide an illumination beam. The at least one light valve is disposed on a transmission path of the illumination beam to modulate the illumination beam into an image beam. The projection lens is disposed on a transmission path of the image beam.

Based on the foregoing, one or more embodiments of the invention have at least one of the following advantages or effects. The first beam and the second beam provided in one or more embodiments of the invention may pass through the first diffusion region and the second diffusion region with different diffusion degrees, respectively, or the first beam may sequentially pass through two diffusion elements, and the second beam may pass through one diffusion element. Therefore, the beam encountering a serious speckle issue may be arranged to pass through a diffusion region with a larger diffusion degree or pass through a relatively large quantity of diffusion elements, so as to enhance the diffusion effect. The beam with a slight speckle issue may be arranged to pass through a diffusion region with a smaller diffusion degree or pass through a relatively small quantity of diffusion elements, so as to avoid a decrease in the optical coupling efficiency. As such, the illumination system and the projection device provided in one or more embodiments of the invention may effectively resolve the speckle issue of the beam and have better optical efficiency.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
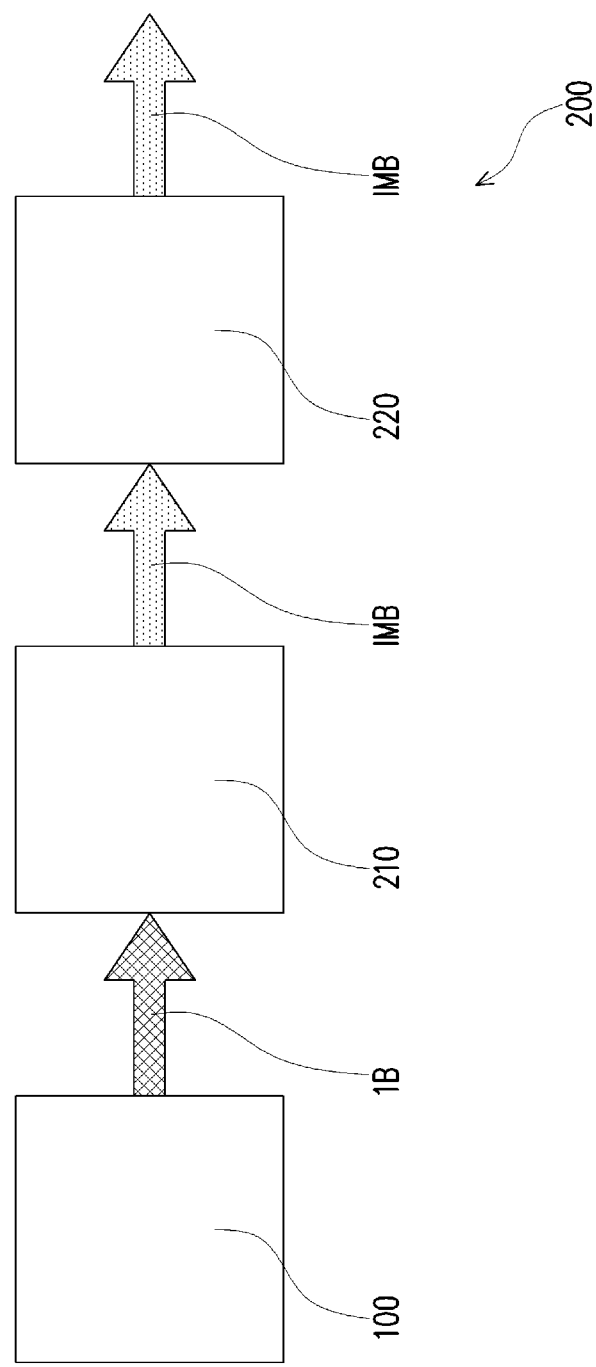
FIG. 1 is a schematic diagram of a projection device according to an embodiment of the invention.

FIG. 1 is a schematic diagram of a projection device according to an embodiment of the invention. With reference to FIG. 1, a projection device 200 provided in the embodiment includes an illumination system 100, at least one light valve 210, and a projection lens 220. The illumination system 100 is configured to provide an illumination beam IB. The at least one light valve 210 is disposed on a transmission path of the illumination beam IB, so as to modulate the illumination beam IB into an image beam IMB. The projection lens 220 is disposed on a transmission path of the image beam IMB, and is configured to project the image beam IMB onto a screen or a wall (not shown) to form an image picture. After the illumination beams IB of different colors are irradiated on the at least one light valve 210, the at least one light valve 210 converts the illumination beams IB of different colors into the image beams IMB according to time sequence and transmits the image beams to the projection lens 220. Therefore, image pictures of the image beams IMB that is converted by the at least one light valve 210 and that is projected out of the projection device 200 can become color pictures.

In the embodiment, the light valve 210 is, for example, a reflective light modulator such as a digital micro-mirror device (DMD), a liquid-crystal-on-silicon (LCOS) panel, or the like. However, in other embodiments, the light valve 210 may also be a penetrated optical modulator such as a transparent liquid crystal panel, an electro-optical modulator, a magneto-optic modulator, an acousto-optic modulator (AOM), and the like. The invention does not limit the number, form, and category of the light valves 210.

In the embodiment, the projection lens 220 includes, for example, a combination of one or more dioptric optical lenses, and the optical lenses includes, for example, non-planar lenses such as a biconcave lens, a biconvex lens, a concave-convex lens, a convex-concave lens, a plano-convex lens, a plano-concave lens, and the like, or various combinations thereof. The invention does not limit the form and category of the projection lens 220.

Different embodiments of the illumination system 100 provided in the embodiment will be described in detail in the following paragraphs, wherein the illumination system 100 may be an illumination system 100a of a first embodiment or an illumination system 100b of a second embodiment below.

Figure 2:
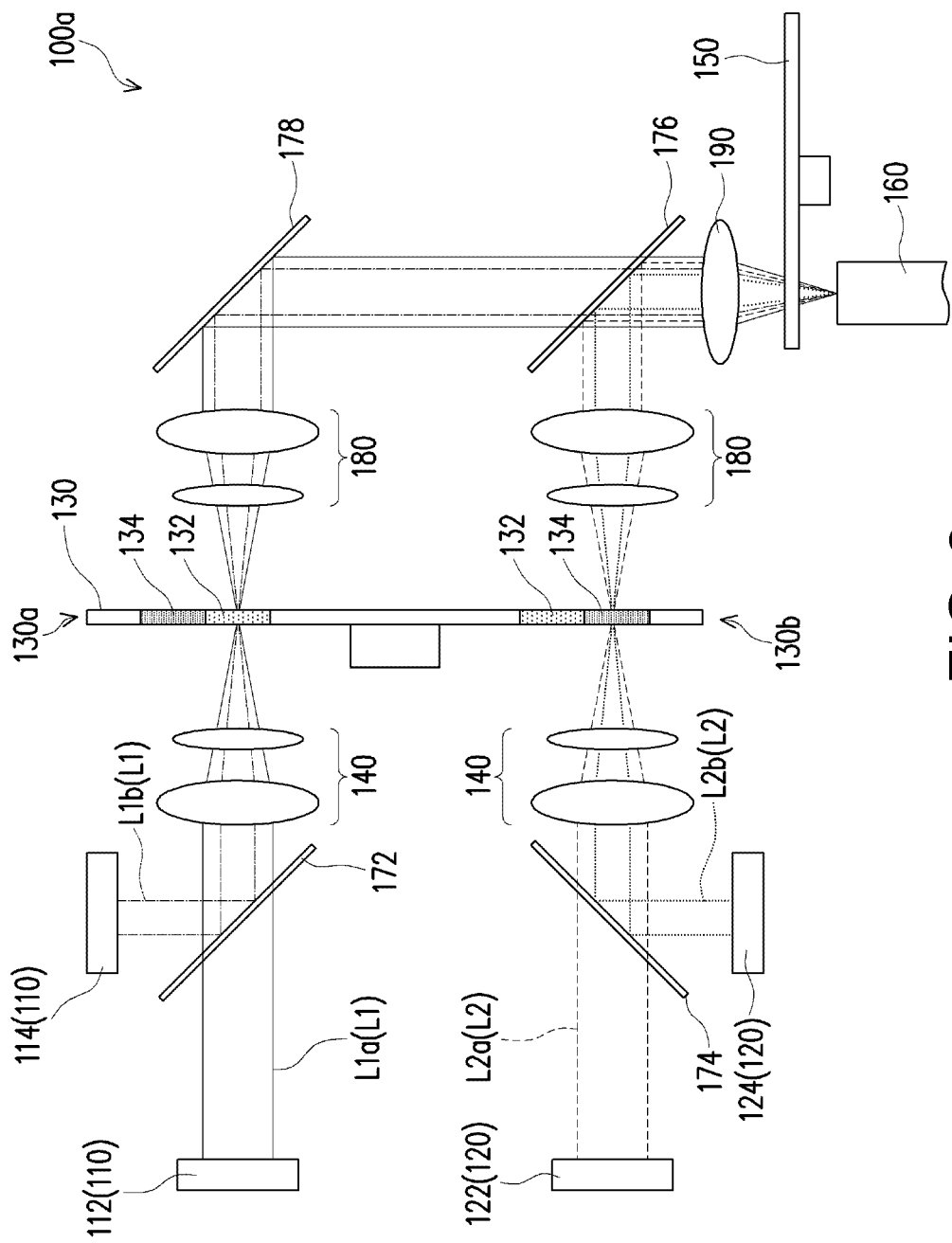
FIG. 2 is a schematic diagram of an illumination system according to a first embodiment of the invention.
Figure 3:
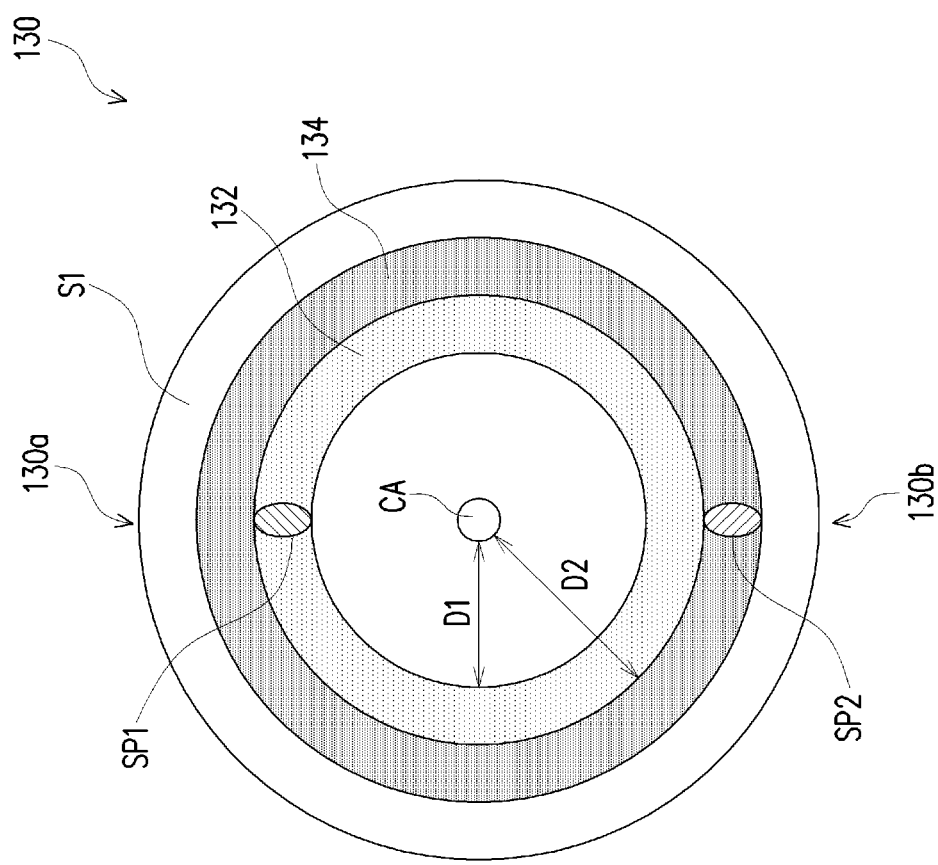
FIG. 3 is a schematic front view of the diffusion element in FIG. 2.

FIG. 2 is a schematic diagram of an illumination system according to a first embodiment of the invention. FIG. 3 is a schematic front view of the diffusion element in FIG. 2. With reference to FIG. 2 and FIG. 3 together, the illumination system 100a includes a first light source 110, a second light source 120, and a diffusion element 130. The first light source 110 is configured to emit a first beam L1, and the second light source 120 is configured to emit a second beam L2. The first beam L1 and the second beam L2 include different colors. The diffusion element 130 is disposed on transmission paths of the first beam L1 and the second beam L2, and includes a first diffusion region 132 and a second diffusion region 134 with different diffusion degrees (hazes). The first beam L1 and the second beam L2 pass through the diffusion element 130 once, respectively, wherein the first beam L1 passes through the first diffusion region 132, and the second beam L2 passes through the second diffusion region 134.

In the embodiment, the first light source 110 and the second light source 120 may include a laser diode (LD), a light-emitting diode (LED), or an array or group formed by one of the foregoing two, but the invention is not limited thereto. In the embodiment, the first light source 110 and the second light source 120 are laser light emitting elements including the laser diode. In addition, the first light source 110 and the second light source 120 may include a plurality of sub-light sources, respectively, so that the first beam L1 and the second beam L2 may be excitation beams and include a plurality of sub-beams, respectively. For example, the first light source 110 may include a sub-light source 112 and a sub-light source 114. The sub-light source 112 is configured to emit a sub-beam L1a, the sub-light source 114 is configured to emit a sub-beam L1b, and the first beam L1 includes the sub-beam L1a and the sub-beam L1b. The second light source 120 may include a sub-light source 122 and a sub-light source 124. The sub-light source 122 is configured to emit a sub-beam L2a, the sub-light source 124 is configured to emit a sub-beam L2b, and the second beam L2 includes the sub-beam L2a and the sub-beam L2b. It should be noted that the number of sub-light sources in FIG. 2 is only an illustrative example, and the first light source 110 and the second light source 120 may include more or fewer sub-light sources, respectively.

For example, the sub-light source 112 may include a green laser diode bank, the sub-light source 114 may include a blue laser diode bank, and the sub-light source 122 may include a red laser diode bank, the sub-light source 124 may include a red laser diode bank or an infrared laser diode bank, the first beam L1 includes a green laser beam and a blue laser beam, and the second beam L2 includes a red laser beam and/or an infrared laser beam, but the invention is not limited thereto. It should be noted that when the sub-light source 122 and the sub-light source 124 both include a red laser diode bank, the sub-beam L2a and the sub-beam L2b may have different polarization directions. For example, the sub-beam L2a may be P-polarized light, and the sub-beam L2b may be S-polarized light.

In the embodiment, the diffusion element 130 is a rotating member. The diffusion element 130 includes a substrate S1 and rotates around a central axis CA as a rotating shaft. The substrate S1 includes a first diffusion region 132 and a second diffusion region 134 configured in a ring shape. The first diffusion region 132 and the second diffusion region 134 are disposed concentrically around the central axis CA. The first diffusion region 132 and the second diffusion region 134 may be configured with diffusion sheets, diffusion particles, or diffusion structures for reducing or eliminating the speckle issue of the laser beam.

The first beam L1 and the second beam L2 pass through the first diffusion region 132 and the second diffusion region 134 with different diffusion degrees (hazes), respectively. Therefore, the beam encountering a serious speckle issue may be arranged to pass through a diffusion region with a larger diffusion degree (haze), so as to enhance the diffusion effect. The beam with a slight speckle issue may be arranged to pass through a diffusion region with a smaller diffusion degree (haze), so as to avoid a decrease in optical coupling efficiency. In this way, the speckle issue of the beam may be effectively resolved, and better optical efficiency may be achieved.

For example, when a serious speckle issue occurs in the first beam L1, and a slight speckle issue occurs in the second beam L2, the diffusion degree (haze) of the first diffusion region 132 may be greater than the diffusion degree (haze) of the second diffusion region 134. Conversely, when a slight speckle issue occurs in the first beam L1, and a serious speckle issue occurs in the second beam L2, the diffusion degree (haze) of the first diffusion region 132 may be less than the diffusion degree (haze) of the second diffusion region 134.

As shown in FIG. 3, the first diffusion region 132 and the second diffusion region 134 do not overlap. There is a first shortest distance D1 between the first diffusion region 132 and a central axis CA of the diffusion element 130 in a radial direction, and there is a second shortest distance D2 between the second diffusion region 134 and the central axis CA of the diffusion element 130 in the radial direction, the first shortest distance D1 being different from the second shortest distance D2. In the embodiment, the first diffusion region 132 is located between the second diffusion region 134 and the central axis CA, and therefore, the first shortest distance D1 is less than the second shortest distance D2. In other embodiments, the second diffusion region 134 may be located between the first diffusion region 132 and the central axis CA. Therefore, the first shortest distance D1 between the first diffusion region 132 and the central axis CA of the diffusion element 130 in the radial direction is greater than the second shortest distance D2 between the second diffusion region 134 and the central axis CA of the diffusion element 130 in the radial direction.

As shown in FIG. 2 and FIG. 3, the first light source 110 and the second light source 120 are located on the same side of the diffusion element 130. Therefore, the first beam L1 and the second beam L2 pass through the diffusion element 130 from the same side of the diffusion element 130 to the other side of the diffusion element 130 in the same direction. The diffusion element 130 has a first end 130a and a second end 130b. The first end 130a and the second end 130b are located on opposite sides of the substrate S1 around the central axis CA as a central point. The first beam L1 passes through the first diffusion region 132 at a position close to the first end 130a, and the second beam L2 passes through the second diffusion region 134 at a position close to the second end 130b. Therefore, alight spot SP1 formed by the first beam L1 on the first diffusion region 132 of the diffusion element 130 and a light spot SP2 formed by the second beam L2 on the second diffusion region 134 of the diffusion element 130 are located on opposite sides of the central axis CA, respectively.

Since the first light source 110 and the second light source 120 may be disposed at different positions, so that the first beam L1 and the second beam L2 irradiate at different positions of the diffusion element 130, and the number of configured light sources may be relatively flexible. In addition, the first beam L1 and the second beam L2 are dispersedly irradiated at different positions of the diffusion element 130, so that energy density on the diffusion element 130 may be reduced without excessive concentration to avoid burning the diffusion element 130, and therefore, the diffusion element may have longer service life.

With reference to FIG. 2 again, the illumination system 100a further includes two focusing lenses 140. One (for example, a focusing lens 140 above in FIG. 2) of the two focusing lenses 140 is located on the transmission path of the first beam L1 and is disposed between the first light source 110 and the diffusion element 130. The other (for example, a focusing lens 140 below in FIG. 2) of the two focusing lenses 140 is located on the transmission path of the second beam L2 and is disposed between the second light source 120 and the diffusion element 130. The first diffusion region 132 and/or the second diffusion region 134 of the diffusion element 130 are disposed at a focal position of the two focusing lenses 140, respectively. It should be noted that the focusing lens herein may be a single lens, or may be composed of a plurality of lenses, and the invention is not limited thereto.

In detail, the first beam L1 and the second beam L2 may be collimated beams before passing through the focusing lens 140. Therefore, when the first diffusion region 132 and the second diffusion region 134 of the diffusion element 130 are disposed at the focal positions of the two focusing lenses 140, respectively, the first beam L1 and the second beam L2 may be roughly concentrated on an optical axis when passing through the first diffusion region 132 and the second diffusion region 134, respectively, so as to avoid unexpected changes (for example, the light spot expands) in the subsequent spot size.

Furthermore, the illumination system 100a may further include a diffusion element 150 and a light homogenizing element 160. The diffusion element 150 is disposed on the transmission paths of the first beam L1 and the second beam L2 from the diffusion element 130, so as to enhance the overall effect of resolving the speckle issue. The light homogenizing element 160 is disposed on the transmission paths of the first beam L1 and the second beam L2 from the diffusion element 150, and is used for homogenizing the first beam L1 and the second beam L2 to form an illumination beam IB to be output. In the embodiment, a diffusion degree (haze) of the diffusion element 150 may be less than the diffusion degrees (hazes) of the first diffusion region 132 and the second diffusion region 134 of the diffusion element 130. In other embodiments, the diffusion element 150 may be omitted, or the diffusion element 150 may be replaced with a color filter element having a diffusing function. The light homogenizing element 160 is an optical element that is capable of homogenizing beams passing through the light homogenizing element 160. In the embodiment, the light homogenizing element 160 is, for example, an integration rod. In other embodiments, the light homogenizing element 160 may also be a lens array or other optical elements having a light homogenizing effect.

In addition, the illumination system 100a may further include other optical elements to adjust the beam inside the illumination system 100a or an optical path thereof. For example, the illumination system 100a may include a light combining element 172, a light combining element 174, a light combining element 176, a reflecting element 178, two collimating lenses 180, and a focusing lens 190. The light combining element 172 is disposed on transmission paths of the sub-beam L1a and the sub-beam L1b of the first beam L1. The light combining element 174 is disposed on transmission paths of the sub-beam L2a and the sub-beam L2b of the second beam L2. The reflecting element 178 is disposed on the transmission path of the first beam L1 from the diffusion element 130. The light combining element 176 is disposed on the transmission path of the first beam L1 from the reflecting element 178 and on the transmission path of the second beam L2 from the diffusion element 130. One (for example, a collimating lens 180 above in FIG. 2) of the two collimating lenses 180 is located on the transmission path of the first beam L1 and is disposed between the diffusion element 130 and the reflecting element 178. The other (for example, a collimating lens 180 below in FIG. 2) of the two collimating lenses 180 is located on the transmission path of the second beam L2 and is disposed between the diffusion element 130 and the light combining element 176. The focusing lens 190 is disposed on the transmission paths of the first beam L1 and the second beam L2 and is disposed between the light combining element 176 and the diffusion element 150.

Specifically, the light combining element 172 and the light combining element 176 may be color separation units such as dichroic mirrors (DM) or color splitting prisms, and may provide different optical effects for beams of different colors/wavelengths. In addition, in an embodiment in which the sub-beam L2a and the sub-beam L2b of the second beam L2 include a red laser beam and an infrared laser beam, respectively, the light combining element 174 may also be a color separation unit. In addition, in an embodiment in which both the sub-beam L2a and the sub-beam L2b of the second beam L2 include the red laser beam, the light combining element 174 may be a polarizing beam splitter, and may provide different optical effects for beams with different polarization directions.

In the embodiment, the light combining element 172 may be designed such that the sub-beam L1a penetrates and reflects the sub-beam L1b, so as to combine the sub-beam L1a and the sub-beam L1b and transmit the two sub-beams to the diffusion element 130. That is, the light combining element 172 is, for example, a dichroic mirror that allows green light to penetrate and reflect blue light. The light combining element 174 may be designed such that the sub-beam L2a penetrates and reflects the sub-beam L2b, so as to combine the sub-beam L2a and the sub-beam L2b and transmit the two sub-beams to the diffusion element 130. That is, the light combining element 174 is, for example, a dichroic mirror that allows red light to penetrate and reflect infrared light, or a polarizing beam splitter that allows P-polarized light to penetrate and reflect S-polarized light. The light combining element 176 may be designed such that the sub-beam L1a and the sub-beam L1b of the first beam L1 penetrate and reflect the sub-beam L2a and the sub-beam L2b of the second beam L2, so as to combine the sub-beam L1a and the sub-beam L1b of the first beam L1 and the sub-beam L2a and the sub-beam L2b of the second beam L2, and transmit these sub-beams to the light homogenizing element 160. That is, the light combining element 176 may be, for example, a dichroic mirror that allows blue light and green light to penetrate and reflect red light and infrared light.

It should be noted herein that, some content in the foregoing embodiments is still used in the following embodiments, and descriptions of the same technical content are omitted. For the same element name, reference may be made to the same content in the foregoing embodiments. The descriptions thereof are omitted in the following embodiments.

Figure 4:
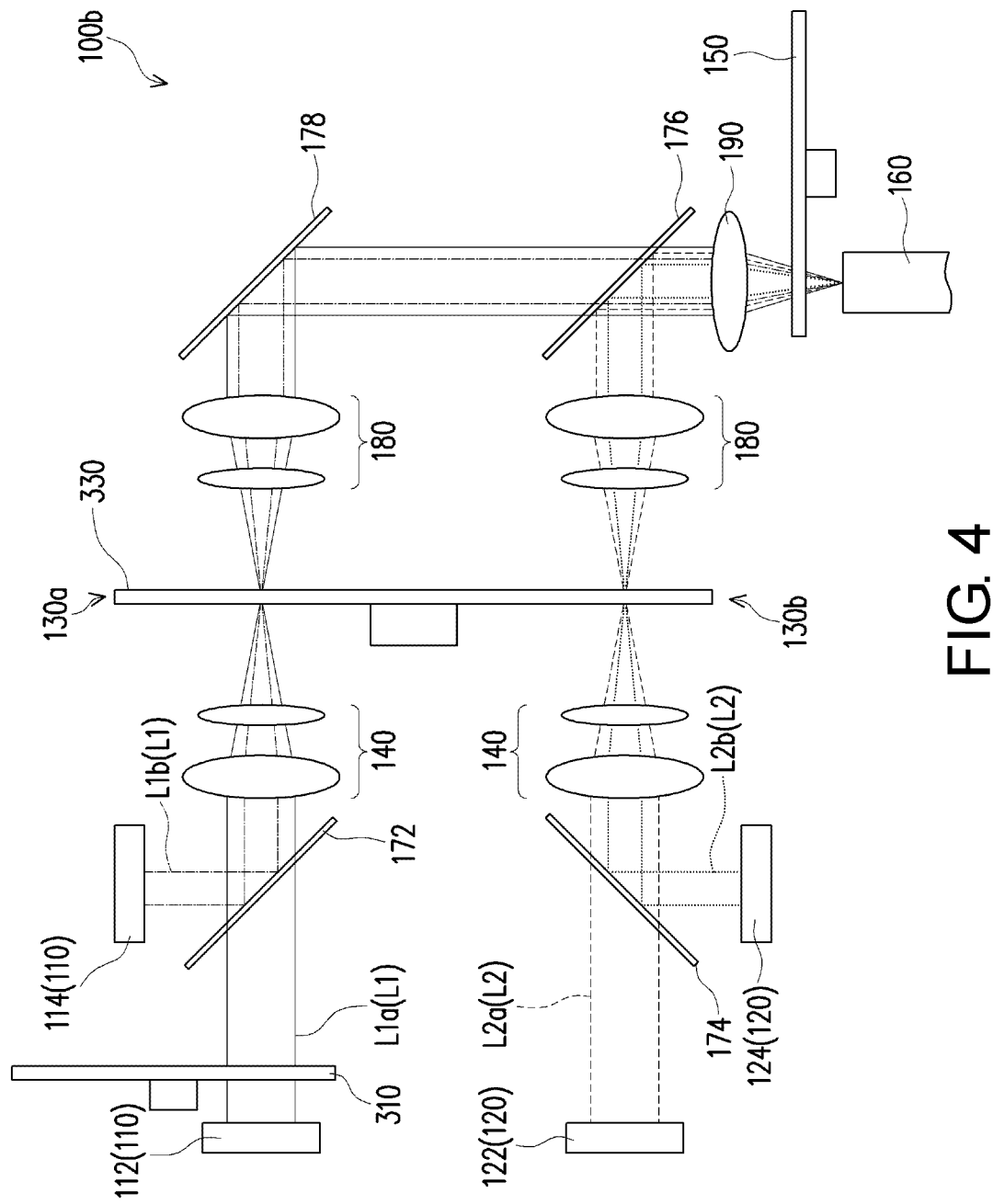
FIG. 4 is a schematic diagram of an illumination system according to a second embodiment of the invention.

FIG. 4 is a schematic diagram of an illumination system according to a second embodiment of the invention. With reference to FIG. 4, an illumination system 100b provided in the embodiment is similar to the illumination system 100a of the first embodiment. A main difference the two in architecture is that a diffusion element 330 provided in the embodiment may not have different diffusion regions with different diffusion degrees (hazes), and the illumination system 100b of the embodiment further includes a diffusion element 310 disposed on a transmission path of a first beam L1. In detail, the diffusion element 310 provided in the embodiment is disposed between the diffusion element 330 and a sub-light source 112 and/or a sub-light source 114 of a first light source 110. As shown in FIG. 4, when a more serious speckle issue occurs in the sub-light source 112 of the first light source 110 than speckle issue in other light sources, the diffusion element 310 may be disposed only on a transmission path of a sub-beam L1a emitted by the sub-light source 112, and is disposed between the sub-light source 112 of the first light source 110 and the light combining element 172. In other embodiments, when a more serious speckle issue occurs in the sub-light source 114 of the first light source 110 than speckle issues in other light sources, the diffusion element 310 may be disposed only on a transmission path of a sub-beam L1b emitted by the sub-light source 114, and is disposed between the sub-light source 114 of the first light source 110 and the light combining element 172. Alternatively, when more serious speckle issues occur in the sub-light source 112 and the sub-light source 114 of the first light source 110 than speckle issues in other light sources, the diffusion element 310 may be disposed on the transmission paths of the sub-beam L1a and the sub-beam L1b of the first beam L1, and is disposed between the first light source 110 and the diffusion element 330. In the embodiment, a diffusion degree (haze) of the diffusion element 310 is less than a diffusion degree (haze) of the diffusion element 330, and is less than a diffusion degree (haze) of the diffusion element 150. The diffusion degree (haze) of the diffusion element 150 is less than the diffusion degree (haze) of the diffusion element 330.

The first beam L1 may sequentially pass through a relatively large quantity of diffusion elements (the diffusion element 310, the diffusion element 330, and the diffusion element 150), and the second beam L2 may pass through a relatively small quantity of diffusion elements (the diffusion element 330 and the diffusion element 150). Therefore, the beam encountering a serious speckle issue may be caused to pass through a relatively large quantity of diffusion elements to enhance the diffusion effect. The beam with a slight speckle issue may be arranged to pass through a relatively small quantity of diffusion elements, so as to avoid a decrease in optical coupling efficiency. In this way, the speckle issue of the beam may be effectively resolved, and better optical efficiency may be achieved.

To sum up, the first beam and the second beam provided in one or more embodiments the invention may pass through the first diffusion region and the second diffusion region with different diffusion degrees (hazes), respectively, or the first beam may sequentially pass through two diffusion elements while the second beam may pass through one diffusion element. Therefore, the beam encountering a serious speckle issue may be arranged to pass through a diffusion region with a larger diffusion degree (haze) or pass through a relatively large quantity of diffusion elements, so as to enhance the diffusion effect. The beam with a slight speckle issue may be arranged to pass through a diffusion region with a smaller diffusion degree (haze) or pass through a relatively small quantity of diffusion elements, so as to avoid a decrease in optical coupling efficiency. As such, the illumination system and the projection device provided in one or more embodiments of the invention may effectively resolve the speckle issue of the beam and have better optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. An illumination system, comprising: a first light source, a second light source, and a first diffusion element,
   wherein the first light source is configured to emit a first beam, the second light source is configured to emit a second beam, and the first beam and the second beam have different colors,
   wherein the first diffusion element comprising a substrate and rotating around a central axis as a rotating shaft is disposed on transmission paths of the first beam and the second beam, the first diffusion element comprises a first diffusion region and a second diffusion region with different diffusion degrees, the first diffusion region and the second diffusion region are configured in a ring shape, and the first beam and the second beam pass through the first diffusion element once, respectively, wherein the first beam passes through the first diffusion region, and the second beam passes through the second diffusion region,
   wherein a first light spot formed by the first beam on the first diffusion region and a second light spot formed by the second beam on the second diffusion region are located on opposite sides of the central axis of the first diffusion element, respectively.

2. The illumination system according to claim 1, wherein a first shortest distance is between the first diffusion region and the central axis of the first diffusion element in a radial direction, a second shortest distance is between the second diffusion region and the central axis of the first diffusion element in the radial direction, and the first shortest distance is different from the second shortest distance.

3. The illumination system according to claim 2, wherein the first diffusion region is located between the second diffusion region and the central axis, or the second diffusion region is located between the first diffusion region and the central axis.

4. The illumination system according to claim 2, wherein the first diffusion element is a rotating member and rotates around the central axis.

5. The illumination system according to claim 1, wherein the first light source and the second light source are located on a same side of the first diffusion element.

6. The illumination system according to claim 1, further comprising: a second diffusion element disposed on the transmission paths of the first beam and the second beam from the first diffusion element.

7. The illumination system according to claim 6, wherein a diffusion degree of the second diffusion element is less than the diffusion degrees of the first diffusion region and the second diffusion region of the first diffusion element.

8. The illumination system according to claim 1, further comprising: two focusing lenses, one of the two focusing lenses being located on the transmission path of the first beam and disposed between the first light source and the first diffusion element, the other of the two focusing lenses being located on the transmission path of the second beam and disposed between the second light source and the first diffusion element, wherein the first diffusion region or the second diffusion region of the first diffusion element is disposed at a focal position of the two focusing lenses, respectively.

9. An illumination system, comprising: a first light source, a second light source, a first diffusion element, and a second diffusion element,
- wherein the first light source is configured to emit a first beam, the second light source is configured to emit a second beam, and the first beam and the second beam have different colors, respectively,
- wherein the first diffusion element is disposed on a transmission path of the first beam,
- wherein the second diffusion element comprising a substrate and rotating around a first central axis as a rotating shaft is disposed on a transmission path of the second beam and on the transmission path of the first beam from the first diffusion element, the second diffusion element comprises a first diffusion region and a second diffusion region with different diffusion degrees, the first diffusion region and the second diffusion region are configured in a ring shape,
- wherein the first beam passes through the first diffusion region, and the second beam passes through the second diffusion region, a first light spot formed b the first beam on the first diffusion region and a second light spot formed by the second beam on the second diffusion region are located on opposite sides of the first central axis of the first diffusion element, respectively.

10. An illumination system, comprising: a first light source, a second light source, a first diffusion element, and a second diffusion element,
- wherein the first light source is configured to emit a first beam, the second light source is configured to emit a second beam, and the first beam and the second beam have different colors, respectively,
- wherein the first diffusion element is disposed on a transmission path of the first beam,
- wherein the second diffusion element is disposed on a transmission path of the second beam and on the transmission path of the first beam from the first diffusion element, and the first beam and the second beam pass through different positions on the second diffusion element, respectively,
- wherein a diffusion degree of the first diffusion element is less than a diffusion degree of the second diffusion element.

11. The illumination system according to claim 9, wherein the first diffusion element and the second diffusion element are rotating members, the first diffusion element rotates around a second central axis and the second diffusion element rotates around the first central axis.

12. The illumination system according to claim 9, wherein the first light source and the second light source are located on a same side of the first diffusion element.

13. The illumination system according to claim 9, further comprising: a third diffusion element disposed on the transmission paths of the first beam and the second beam from the second diffusion element.

14. The illumination system according to claim 13, wherein a diffusion degree of the third diffusion element is less than the diffusion degrees of the first diffusion region and the second diffusion region of the second diffusion element.

15. The illumination system according to claim 13, wherein a diffusion degree of the third diffusion element is greater than a diffusion degree of the first diffusion element.

16. The illumination system according to claim 9, further comprising: two focusing lenses, one of the two focusing lenses being located on the transmission path of the first beam and disposed between the first diffusion element and the second diffusion element, the other of the two focusing lenses being located on the transmission path of the second beam and disposed between the second light source and the second diffusion element, wherein the second diffusion element is disposed at a focal position of the two focusing lenses.

17. A projection device, comprising:
- the illumination system according to claim 1, the illumination system being configured to provide an illumination beam;
- at least one light valve disposed on a transmission path of the illumination beam to modulate the illumination beam into an image beam; and
- a projection lens disposed on a transmission path of the image beam.

18. A projection device, comprising:
- the illumination system according to claim 9, the illumination system being configured to provide an illumination beam;
- at least one light valve disposed on a transmission path of the illumination beam to modulate the illumination beam into an image beam; and
- a projection lens disposed on a transmission path of the image beam.

* * * * *